US012299529B2

(12) United States Patent
Wu et al.

(10) Patent No.: US 12,299,529 B2
(45) Date of Patent: *May 13, 2025

(54) SUBREGION TRANSFORMATION FOR LABEL DECODING BY AN AUTOMATED CHECKOUT SYSTEM

(71) Applicant: Maplebear Inc., San Francisco, CA (US)

(72) Inventors: Ganglu Wu, Shanghai (CN); Shiyuan Yang, Shanghai (CN); Xiao Zhou, Shanghai (CN); Qi Wang, Shanghai (CN); Qunwei Liu, Shanghai (CN); Youming Luo, Shanghai (CN)

(73) Assignee: Maplebear Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/587,719

(22) Filed: Feb. 26, 2024

(65) Prior Publication Data

US 2024/0202475 A1 Jun. 20, 2024

Related U.S. Application Data

(63) Continuation of application No. 18/169,010, filed on Feb. 14, 2023, now Pat. No. 11,948,044, which is a (Continued)

(51) Int. Cl.
*G06K 7/14* (2006.01)
*G06Q 20/20* (2012.01)
(Continued)

(52) U.S. Cl.
CPC ......... *G06K 7/1413* (2013.01); *G06K 7/1443* (2013.01); *G06Q 20/208* (2013.01);
(Continued)

(58) Field of Classification Search
CPC .... G06K 7/1413; G06K 7/1447; G06V 10/25; G06Q 30/0633; G06Q 30/0641; G06Q 20/208; G06T 9/00; G06T 3/40
(Continued)

(56) References Cited

U.S. PATENT DOCUMENTS

2010/0309226 A1* 12/2010 Quack ................... G06F 16/50
382/218
2018/0322321 A1 11/2018 Jiang et al.
(Continued)

FOREIGN PATENT DOCUMENTS

CN 114926347 A 8/2022
WO WO 2020/211499 A1 10/2020

OTHER PUBLICATIONS

PCT International Search Report and Written Opinion, PCT Application No. PCT/CN2022/140152, Aug. 22, 2023, 7 pages.
(Continued)

*Primary Examiner* — Edwyn Labaze
(74) *Attorney, Agent, or Firm* — Fenwick & West LLP

(57) ABSTRACT

An automated checkout system modifies received images of machine-readable labels to improve the performance of a label detection model that the system uses to decode item identifiers encoded in the machine-readable labels. For example, the automated checkout system may transform subregions of an image of a machine-readable label to adjust for distortions in the image's depiction of the machine-readable label. Similarly, the automated checkout system may identify readable regions within received images of machine-readable labels and apply a label detection model to those readable regions. By modifying received images of machine-readable labels, these techniques improve on existing computer-vision technologies by allowing for the effec-
(Continued)

tive decoding of machine-readable labels based on real-world images using relatively clean training data.

20 Claims, 8 Drawing Sheets

Related U.S. Application Data continuation of application No. PCT/CN2022/140152, filed on Dec. 19, 2022.

(51) Int. Cl.
  *G06Q 30/0601*   (2023.01)
  *G06T 3/40*   (2006.01)
  *G06T 9/00*   (2006.01)
  *G06V 10/25*   (2022.01)

(52) U.S. Cl.
  CPC ..... *G06Q 30/0633* (2013.01); *G06Q 30/0641* (2013.01); *G06T 3/40* (2013.01); *G06T 9/00* (2013.01); *G06V 10/25* (2022.01); *G06V 2201/07* (2022.01)

(58) Field of Classification Search
  USPC ............ 235/462.41, 462.24, 462.11, 462.25, 235/462.01, 375
  See application file for complete search history.

(56) References Cited

U.S. PATENT DOCUMENTS

| | | |
|---|---|---|
| 2019/0266749 A1 | 8/2019 | Rhoads et al. |
| 2021/0368061 A1 | 11/2021 | Holub |
| 2022/0067881 A1 | 3/2022 | Li et al. |

OTHER PUBLICATIONS

Tang C. et al., "PLANET: Improved Convolutional Neural Networks with Image Enhancement for Image Classification," Mathematical Problems in Engineering, vol. 2020, Mar. 11, 2020, pp. 1-10.

United States Office Action, U.S. Appl. No. 18/169,012, filed Feb. 25, 2025, 14 pages.

* cited by examiner

SUBREGION TRANSFORMATION FOR LABEL DECODING BY AN AUTOMATED CHECKOUT SYSTEM

CROSS-REFERENCE TO RELATED APPLICATIONS

This application is a continuation of co-pending application U.S. application Ser. No. 18/169,010, filed Feb. 14, 2023, which is a continuation of PCT Application No. PCT/CN2022/140152, filed Dec. 19, 2022, each of which are incorporated by reference.

BACKGROUND

Automated checkout systems allow a customer at a brick-and-mortar store to select and purchase items all without aid from a human attendant. These automated checkout systems may automatically identify items that a user collects as the user collects them. For example, the automated checkout system may identify items in images captured by the user's client device or by cameras attached to a shopping cart to identify items that the user has collected. In some cases, the automated checkout systems may use machine-learning models to identify the collected items. For example, the machine-learning models may be trained to identify an item based on a machine-readable label (e.g., a barcode or a QR code) affixed to the item. U.S. patent application Ser. No. 17/703,076, filed Mar. 24, 2022, describes example machine-learning models for decoding machine-readable labels based on images, the contents of which are incorporated by reference.

However, these machine-learning models commonly require lots of training data to effectively identify item identifiers from images of machine-readable labels. This training data may be difficult or costly to obtain, since the training data commonly needs to be manually labeled by humans. Additionally, training data generated for these machine-learning models commonly does not reflect the real-world conditions in which the models will be applied. This is because training data is typically much "cleaner" than real-world data, meaning the training data is typically created such that the features of the images are easily evaluable by a machine-learning model. Thus, while a machine-learning model may be trained based on images of machine-readable labels that are well-lit, face-on, and without blur, the machine-learning model may need to be applied to images of machine-readable labels that are blurry, taken at weird angles, or in poor lighting. While an automated checkout system may train the machine-learning model based on these kinds of imperfect images, that solution requires even more training data, which can be prohibitively costly. Thus, machine-learning models are typically imperfect at identifying item identifiers encoded in machine-readable labels based on images of those machine-readable labels.

SUMMARY

In accordance with one or more embodiments, an automated checkout system modifies received images of machine-readable labels to improve the performance of a label detection model that the system uses to decode item identifiers encoded in the machine-readable labels.

In some embodiments, the automated checkout system transforms subregions of an image of a machine-readable label to adjust for distortions in the image's depiction of the machine-readable label. The automated checkout system receives an image of a machine-readable label (e.g., a barcode or a QR code). The automated checkout system generates boundary points on the received image and uses the boundary points to break down the image into initial subregions. The automated checkout system generates a transformation matrix for each initial subregion. The transformation matrices contain values that transform each corresponding initial subregion into a shape of a standardized subregion (e.g., converts irregular quadrilateral initial subregions into rectangular standardized subregions).

The automated checkout system applies the transformation matrices to the initial subregions and concatenates the resulting standardized subregions together to generate a modified version of the received image. The automated checkout system may then apply the label detection model to the modified image to identify the item identifier encoded in the machine-readable label.

Additionally, in some embodiments, the automated checkout system identifies readable regions within received images of machine-readable labels and applies a label detection model to those readable regions. The automated checkout system identifies the readable regions by applying a readability detection model to the received image. The readability detection model is a machine-learning model that is trained to identify regions within images of machine-readable labels from which the label detection model is likely to correctly predict the encoded item identifier. The readability detection model may be trained by generating test regions on training images of machine-readable labels and generating training examples based on whether the label detection model can correctly identify the encoded item identifier based on the test regions.

The automated checkout system resizes the readable region of the image identified by the readability detection model to dimensions for input to the label decoding model. For example, the automated checkout system may upsample the portion of the image contained within the readable region to an image that can be input to the label decoding model. The automated checkout system applies the label decoding model to the resized readable region to identify the item identifier encoded in the machine-readable label.

By modifying received images of machine-readable labels, these techniques improve on existing computer-vision technologies by allowing for the effective decoding of machine-readable labels based on real-world images using relatively clean training data. For example, by transforming initial subregions to standardized subregions and concatenating those subregions together, an automated checkout system creates a modified image that more closely resembles clean images of machine-readable label, meaning that a label detection model trained based on clean images of machine-readable labels is more likely to accurately predict item identifiers from the modified images of machine-readable labels than the original images. This benefit is especially helpful where the automated checkout system uses a machine-learning model to generate the transformation matrices for distorted images of machine-readable labels, because transformation matrices cannot conventionally be created without a machine-learning model.

Similarly, by identifying readable subregions of the images, the automated checkout system removes noise in the images that may cause the label detection model to incorrectly identify the item identifier encoded in the machine-learning label. Thus, rather than having to train the label decoding model to ignore those noisy portions of the image, the automated checkout system improves the images received by the label decoding model to already remove the noise.

DETAILED DESCRIPTION

Figure 1:
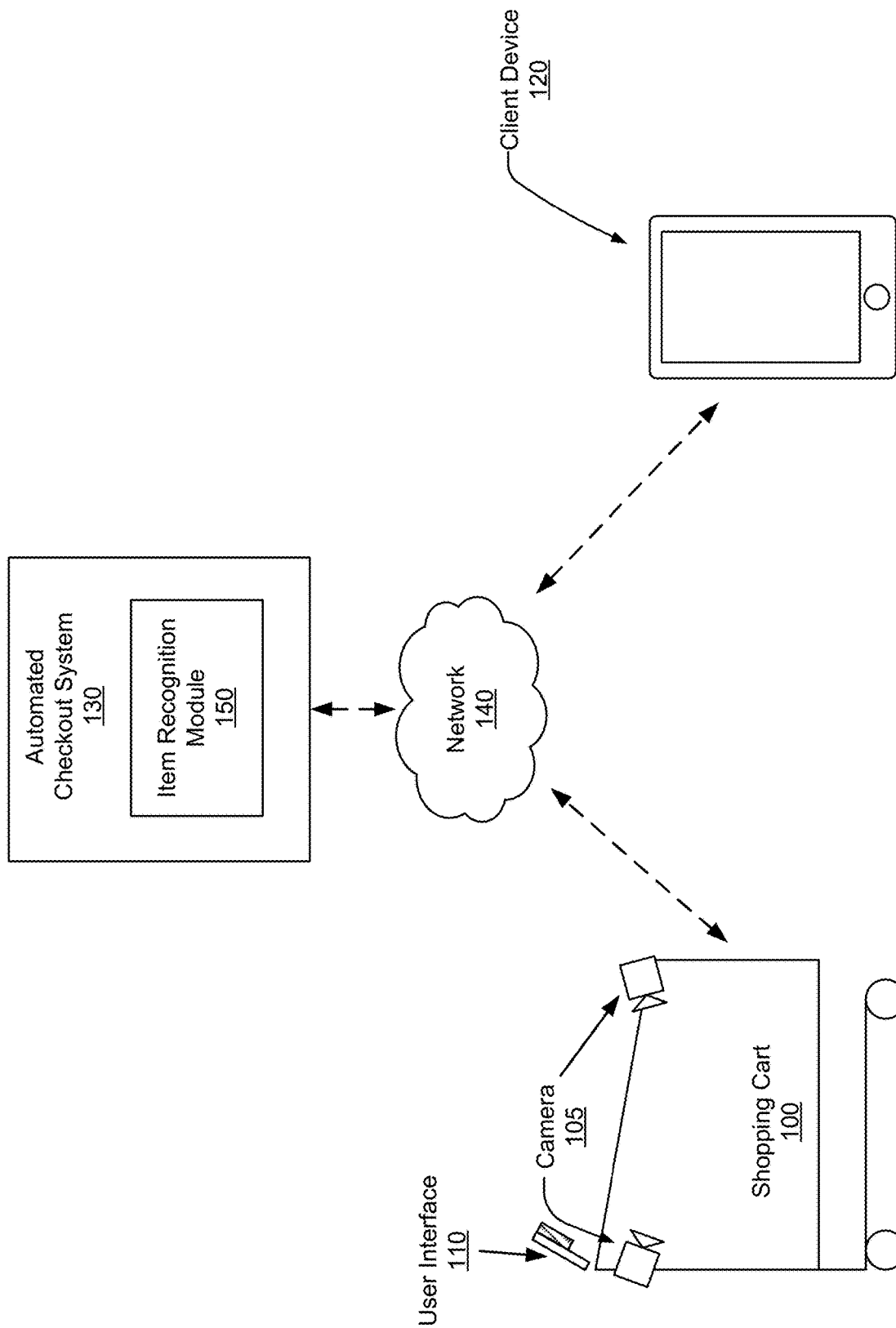
FIG. 1 illustrates an example system environment for an automated checkout system, in accordance with one or more embodiments.

FIG. 1 illustrates an example system environment for an automated checkout system, in accordance with one or more embodiments. The system environment illustrated in FIG. 1 includes a shopping cart 100, a client device 120, an automated checkout system 130, and a network 140. Alternative embodiments may include more, fewer, or different components from those illustrated in FIG. 1, and the functionality of each component may be divided between the components differently from the description below. For example, functionality described below as being performed by the shopping cart may be performed, in one or more embodiments, by the automated checkout system 130 or the client device 120. Similarly, functionality described below as being performed by the automated checkout system 130 may, in one or more embodiments, be performed by the shopping cart 100 or the client device 120. Additionally, each component may perform their respective functionalities in response to a request from a human, or automatically without human intervention.

A shopping cart 100 is a vessel that a user can use to hold items as the user travels through a store. The shopping cart 100 includes one or more cameras 105 that capture image data of the shopping cart's storage area and a user interface 110 that the user can use to interact with the shopping cart 100. The shopping cart 100 may include additional components not pictured in FIG. 1, such as processors, computer-readable media, power sources (e.g., batteries), network adapters, or sensors (e.g., load sensors, thermometers, proximity sensors).

The cameras 105 capture image data of the shopping cart's storage area. The cameras 105 may capture two-dimensional or three-dimensional images of the shopping cart's contents. The cameras 105 are coupled to the shopping cart 100 such that the cameras 105 capture image data of the storage area from different perspectives. Thus, items in the shopping cart 100 are less likely to be overlapping in all camera perspectives. In one or more embodiments, the cameras 105 include embedded processing capabilities to process image data captured by the cameras 105. For example, the cameras 105 may be MIPI cameras.

The shopping cart 100 may include one or more sensors (not shown) that capture measurements describing the shopping cart 100, items in the shopping cart's storage area, or the area around the shopping cart 100. For example, the shopping cart 100 may include load sensors that measure the weight of items placed in the shopping cart's storage area. Similarly, the shopping cart 100 may include proximity sensors that capture measurements for detecting when an item is being added to the shopping cart 100. The shopping cart 100 may transmit data from the one or more sensors to the automated checkout system 130.

In one or more embodiments, the shopping cart 100 captures image data in response to detecting that an item is being added to the storage area. The shopping cart 100 may detect that an item is being added based on sensor data from sensors on the shopping cart 100. For example, the shopping cart 100 may detect that a new item has been added when the shopping cart 100 detects a change in the overall weight of the contents of the storage area based on load data from load sensors. Similarly, the shopping cart 100 may detect that a new item is being added based on proximity data from proximity sensors indicating that something is approaching the storage area of the shopping cart 100. The shopping cart 100 captures image data within a timeframe near when the shopping cart 100 detects a new item. For example, the shopping cart 100 may activate the cameras 105 and store image data in response to detecting that an item is being added to the shopping cart 100 and for some period of time after that detection.

The shopping cart 100 includes a user interface 110 through which the user can interact with the automated checkout system 130. The user interface 110 may include a display, a speaker, a microphone, a keypad, or a payment system (e.g., a credit card reader). The user interface 110 may allow the user to adjust the items in their shopping list or to provide payment information for a checkout process. Additionally, the user interface 110 may display a map of the store indicating where items are located within the store. In one or more embodiments, a user may interact with the user interface 110 to search for items within the store, and the user interface 110 may provide a real-time navigation interface for the user to travel from their current location to an item within the store. The user interface 110 also may display additional content to a user, such as suggested recipes or items for purchase.

A user can also interact with the shopping cart 100 or the automated checkout system 130 through a client device 120. The client device 120 can be a personal or mobile computing device, such as a smartphone, a tablet, a laptop computer, or desktop computer. In one or more embodiments, the client device 120 executes a client application that uses an application programming interface (API) to communicate with the automated checkout system 130 through the network 140.

The client device 120 may allow the user to add items to a shopping list and to checkout through the automated checkout system 130. For example, the user may use the client device 120 to capture image data of items that the user is selecting for purchase, and the client device 120 may provide the image data to the automated checkout system 130 to identify the items that the user is selecting. The client device 120 adjust the user's shopping list based on the identified item. In one or more embodiments, the user can also manually adjust their shopping list through the client device 120.

The shopping cart 100 and client device 120 can communicate with the automated checkout system 130 via a network 140. The network 140 is a collection of computing devices that communicate via wired or wireless connections. The network 140 may include one or more local area networks (LANs) or one or more wide area networks (WANs). The network 140, as referred to herein, is an inclusive term that may refer to any or all of standard layers used to describe a physical or virtual network, such as the physical layer, the data link layer, the network layer, the transport layer, the session layer, the presentation layer, and the application layer. The network 140 may include physical media for communicating data from one computing device to another computing device, such as MPLS lines, fiber optic cables, cellular connections (e.g., 3G, 4G, or 5G spectra), or satellites. The network 140 also may use networking protocols, such as TCP/IP, HTTP, SSH, SMS, or FTP, to transmit data between computing devices. In one or more embodiments, the network 140 may include Bluetooth or near-field communication (NFC) technologies or protocols for local communications between computing devices. The network 140 may transmit encrypted or unencrypted data.

The automated checkout system 130 allows a customer at a brick-and-mortar store to complete a checkout process in which items are scanned and paid for without having to go through a human cashier at a point-of-sale station. The automated checkout system 130 receives data describing a user's shipping trip in a store and generates a shopping list based on items that the user has selected. For example, the automated checkout system 130 may receive image data from a shopping cart 100 and may determine, based on the image data, which items the user has added to their cart. When the user indicates that they are done shopping at the store, the automated checkout system 130 facilitates a transaction between the user and the store for the user to purchase their selected items. As noted above, while the automated checkout system 130 is depicted in FIG. 1 as separate from the shopping cart 100 and the client device 120, some or all of the functionality of the automated checkout system 130 may be performed by the shopping cart 100 or the client device 120, and vice versa.

The automated checkout system 130 establishes a session for a user to associate the user's actions with the shopping cart 100 to that user. The user may establish the session by inputting a user identifier (e.g., phone number, email address, username, etc.) into a user interface 110 of the shopping cart 100. The user also may establish the session through the client device 120. The user may use a client application operating on the client device 120 to associate the shopping cart 100 with the client device 120. The user may establish the session by inputting a cart identifier for the shopping cart 100 through the client application, e.g., by manually typing an identifier or by scanning a barcode or QR code on the shopping cart 100 using the client device 120. In one or more embodiments, the automated checkout system 130 establishes a session between a user and a shopping cart 100 automatically based on sensor data from the shopping cart 100 or the client device 120. For example, the automated checkout system 130 may determine that the client device 120 and the shopping cart 100 are in proximity to one another for an extended period of time, and thus may determine that the user associated with the client device 120 is using the shopping cart 100.

The automated checkout system 130 generates a shopping list for the user as the user adds items to the shopping cart 100. The shopping list is a list of items that the user has gathered that the user intends to purchase. The shopping list may include identifiers for the items that the user has gathered (e.g., SKUs) and a quantity for each item. As illustrated in FIG. 1, the automated checkout system 130 comprises an item recognition module 150, which identifies items that the user places in their shopping cart. To generate the shopping list, the item recognition module 150 analyzes image data captured by the cameras 105 on the shopping cart 100. For example, the automated checkout system 130 may apply a machine-learning model (e.g., a neural network) to image data from the shopping cart 100 to identify an item added to the cart. In some embodiments, the item recognition module 150 modifies received images of machine-readable labels to improve the performance of a label detection model used to decode item identifiers encoded in the machine-readable labels, as described in further detail below with regards to FIGS. 2-8.

The automated checkout system 130 facilitates a checkout by the user through the shopping cart 100. The automated checkout system 130 computes a total cost to the user of the items in the user's shopping list and charges the user for the cost. The automated checkout system 130 may receive payment information from the shopping cart 100 and uses that payment information to charge the user for the items. Alternatively, the automated checkout system 130 may store payment information for the user in user data describing characteristics of the user. The automated checkout system 130 may use the stored payment information as default payment information for the user and charge the user for the cost of the items based on that stored payment information.

In one or more embodiments, a user who interacts with the shopping cart 100 or the client device 120 may be a shopper for an online concierge system. The shopper is a user who collects items from a store on behalf of a user of the online concierge system. For example, a user may submit a list of items that they would like to purchase. The online concierge system may transmit that list to a shopping cart 100 or a client device 120 used by a shopper. The shopper may use the shopping cart 100 or the client device 120 to add items to the user's shopping list. When the shopper has gathered the items that the user has requested, the shopper may perform a checkout process through the shopping cart 100 or client device 120 to charge the user for the items. U.S. Pat. No. 11,195,222, entitled "Determining Recommended Items for a Shopping List," issued Dec. 7, 2021, describes online concierge systems in more detail, and is incorporated by reference herein in its entirety.

Figure 2:
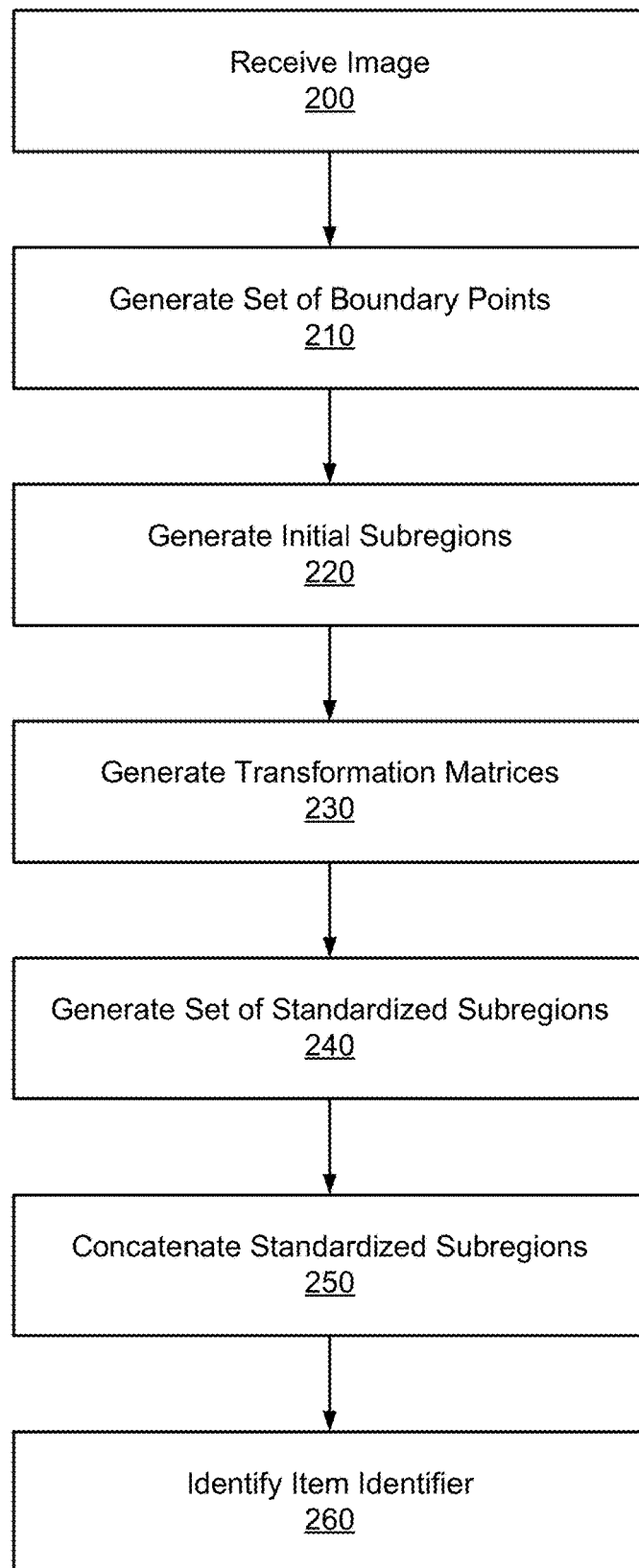
FIG. 2 is a flowchart for a method of transforming subregions of an image of a machine-readable label, in accordance with some embodiments.

FIG. 2 is a flowchart for a method of transforming subregions of an image of a machine-readable label, in accordance with some embodiments. Alternative embodiments may include more, fewer, or different steps from those illustrated in FIG. 2, and the steps may be performed by an automated checkout system (e.g., automated checkout system 130). Additionally, each step may be performed automatically by the automated checkout system without human intervention.

The automated checkout system receives 200 an image depicting a machine-readable label. A machine-readable label is a label affixed to a read world object (e.g., an item) that can be optically read by a computing device. For example, the machine-readable label may be a barcode or a quick response (QR) code. The machine-readable label encodes an item identifier for an item. An item identifier is an identifier used by the automated checkout system to identify an item, such as a SKU or a PLU. The machine-readable label may be affixed to the item for its corresponding encoded item identifier, and the image may depict the item as well as the machine-readable label.

In some embodiments, the automated checkout system receives the image from a client device of a user. For example, the automated checkout system may receive the image from a client device executing a client application for the automated checkout system that allows the user to automatically add items to a shopping list by capturing images of machine-readable labels of items. Alternatively, the automated checkout system may receive the image from a camera on a shopping cart. For example, a camera on a shopping cart may capture an image of the machine-readable label and transmit the machine-readable label to the automated checkout system to identify the item identifier encoded by the machine-readable label.

The automated checkout system generates 210 a set of boundary points for the image. The set of boundary points are points on the image that may be used to create subregions of the image. The automated checkout system may generate a predetermined number of boundary points for an image (e.g., nine boundary points) or may adjust the number of boundary points that are generated for an image. To generate the set of boundary points, the automated checkout system may identify points within the image for four corners of the machine-readable label. The automated checkout system may generate additional points between pairs of the corner points for sides of the machine-readable label, and may generate additional points within the depicted machine-readable label based on the corner points or the side points.

In some embodiments, the automated checkout system uses a machine-learning model to generate the set of boundary points. The machine-learning model may be trained to generate boundary points for an image of a machine-readable label. For example, the machine-learning model may be trained based on a set of training examples that each include an image of a machine-readable label and boundary points labels that indicate where boundary points should be generated. The machine-learning model may be trained to generate a subset of the boundary points (e.g., corner boundary points), and the automated checkout system may apply one or more other algorithms to generate the rest of the boundary points. Alternatively, the machine-learning model may be trained to generate the full set of boundary points.

Figure 3:
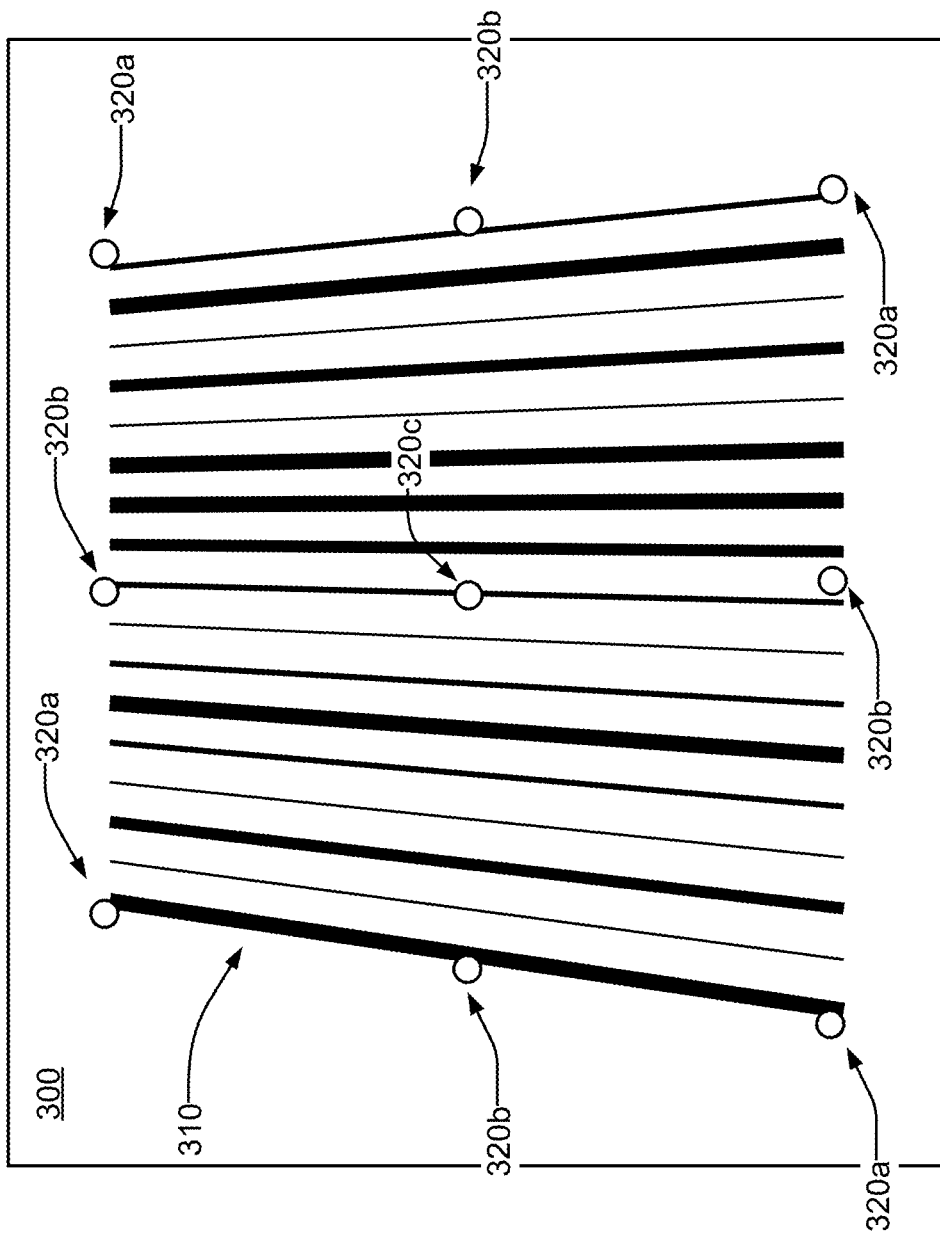
FIG. 3 illustrates an example image of a machine-readable label with boundary points, in accordance with some embodiments.

FIG. 3 illustrates an example image 300 of a machine-readable label 310 with boundary points 320, in accordance with some embodiments. The image 300 of the machine-readable label 310 was captured at an angle, and so the depiction of the machine-readable label 310 in the image 300 is distorted. The boundary points 320 include four corner boundary points 320*a* corresponding to the corners of the machine-readable label 310, and boundary points 320*b* between those corner boundary points 320*a* that correspond to the sides of the machine-readable label 310. The boundary points 320 also include a center boundary point 320*c*, which may be the centroid of the other boundary points 320 or may be a midpoint between pairs of corner boundary points 320*a* or side boundary points 320*b*. FIG. 3 illustrates an example where the automated checkout system generates nine boundary points. However, in alternative instances, the automated checkout system may generate more or fewer boundary points.

The automated checkout system generates 220 a set of initial subregions based on the generated set of boundary points. The initial subregions are regions whose edges connect the set of boundary points without overlapping. Each of the initial subregions may have the same number of sides as the other subregions. For example, each subregion may be a quadrilateral or a triangle whose corners are a subset of the boundary points. The initial subregions may be irregular shapes due to distortions in how the machine-readable label is depicted in the image.

Figure 4:
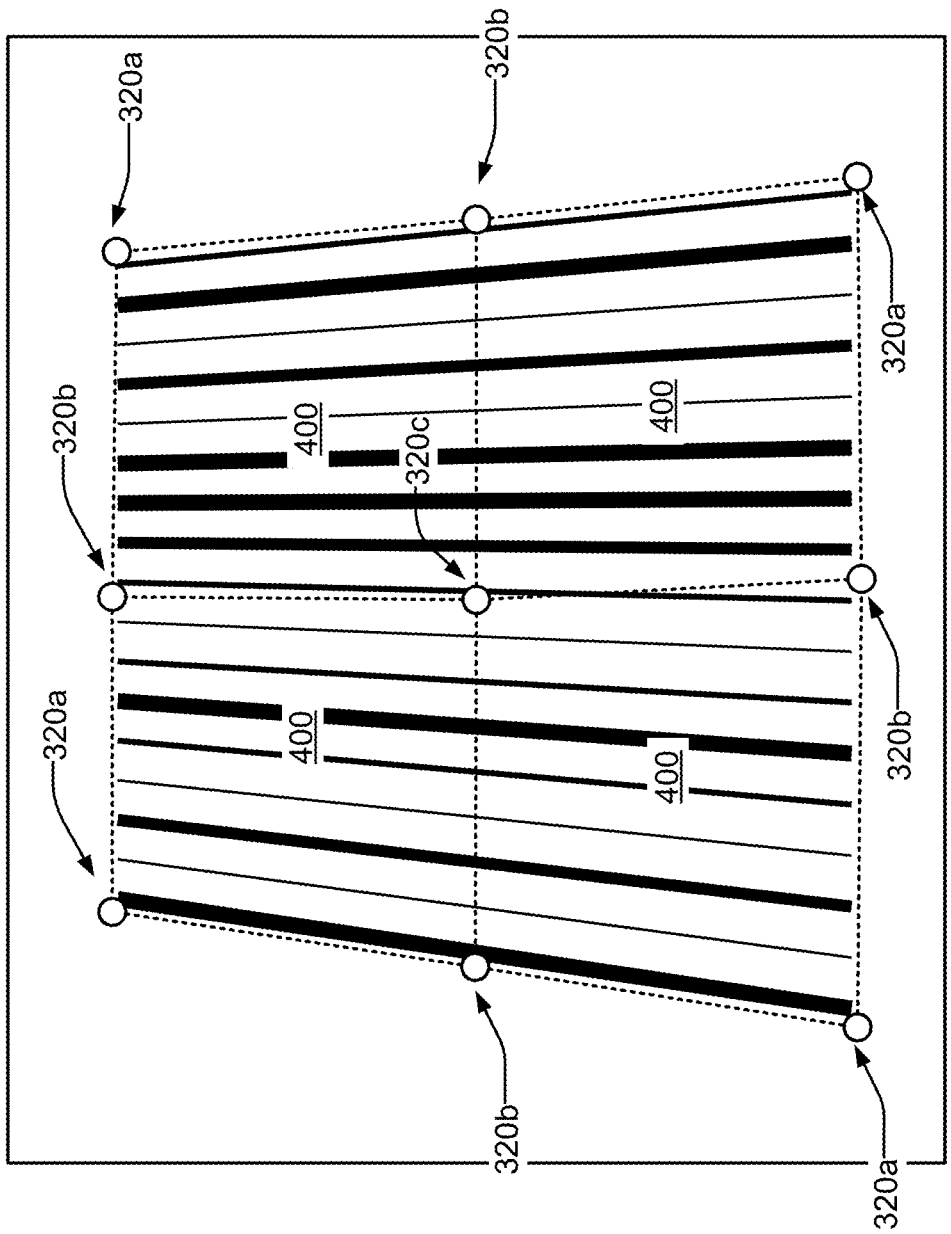
FIG. 4 illustrates an example image of a machine-readable label with initial subregions generated based on the generated boundary points, in accordance with some embodiments.

FIG. 4 illustrates an example image of a machine-readable label with initial subregions 400 generated based on the generated boundary points 320, in accordance with some embodiments. The automated checkout system generates four initial subregions 400 based on the nine illustrated boundary points 320. However, as explained above, the automated checkout system may generate more or fewer initial subregions 400 based on the number of generated boundary points 320. For example, if the automated checkout system generates sixteen boundary points, the automated checkout system may generate nine quadrilateral initial subregions 400. Additionally, while the illustrated example shows quadrilateral initial subregions 400, the automated checkout system may generate initial subregions with different shapes, such as triangles.

The automated checkout system generates 230 a transformation matrix for each of the initial subregions. A transformation matrix is a matrix with values that transform a corresponding initial subregion into a standardized subregion, which is a subregion of the image with a standardized shape. For example, the transformation may translate, rotate, stretch, dilate, barrel distort, or fisheye distort an initial subregion. The transformation matrix may transform an initial subregion into a standardized subregion by mapping pixel values within the initial subregion to positions within the standardized subregion. Alternatively, the transformation matrix may transform an initial subregion into a standardized subregion through matrix multiplication of a matrix representing the initial subregion and the transformation matrix.

In some embodiments, the automated checkout system generates a transformation matrix by applying a machine-learning model to the initial subregion. The machine-learning model is trained to generate a transformation matrix for an initial subregion that transforms the initial subregion into a standardized subregion. For example, the machine-learning model may be trained based on a set of training examples, where each of the training examples includes an initial subregion to transform into a standardized subregion and a label for the transformation matrix that transforms the initial subregion into a standardized subregion.

The automated checkout system generates 240 a set of standardized subregions by applying each transformation matrix to its corresponding initial subregion. A standardized subregion is a transformed version of the portion of the image contained within the corresponding initial subregion from which the standardized subregion is generated. Each standardized subregion has a shape with the same number of sides as their corresponding initial subregions. However, the standardized subregions differ from the initial subregions in that the shape of each standardized subregion may be the same or similar to all other standardized subregions. For example, if the initial subregions were quadrilaterals, the standardized subregions may be rectangular in shape. Similarly, if the initial subregions were scalene triangles, the standardized subregions may be isosceles triangles, right triangles, or equilateral triangles. Thus, when the automated checkout system applies the transformation matrices to the initial subregions, the transformation matrices transform the portions of the image contained in the initial subregions into the shape and size of the standardized subregions.

The automated checkout system concatenates 250 the standardized subregions together to create a modified version of the received image. The automated checkout system concatenates the standardized subregions together such that sides that touched in adjacent initial subregions also touch in their corresponding standardized subregions.

Figure 5:
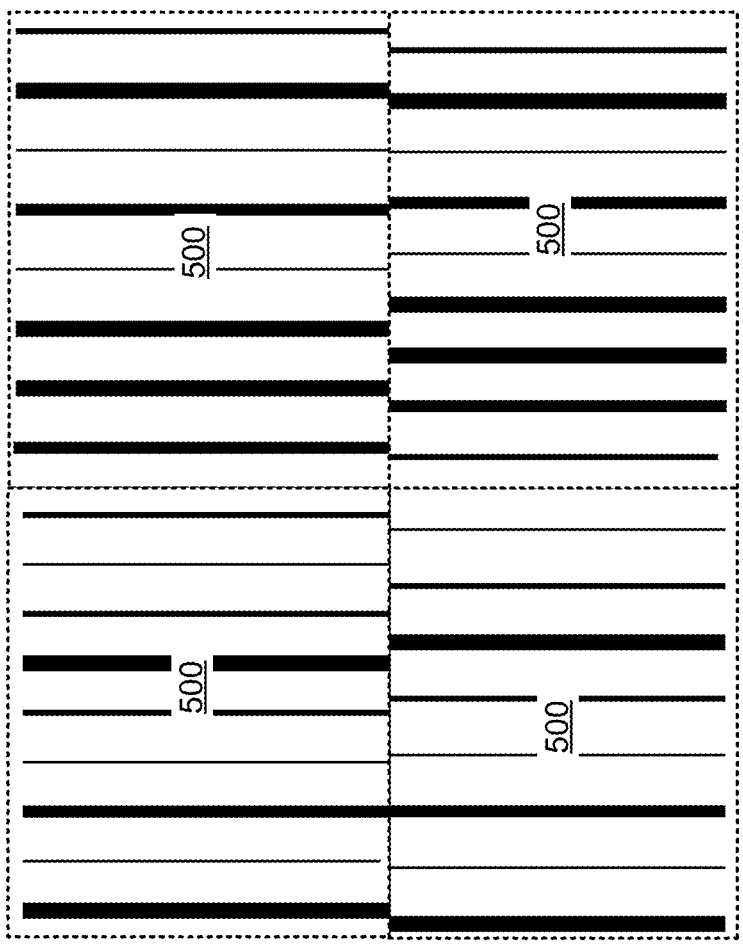
FIG. 5 illustrates an example modified image of a machine-readable label comprising concatenated standardized subregions, in accordance with some embodiments.

FIG. 5 illustrates an example modified image of a machine-readable label comprising concatenated standardized subregions 500, in accordance with some embodiments. Each of the standardized subregions 500 is a transformed version of a corresponding initial subregion 400 illustrated in FIG. 4.

The automated checkout system identifies 260 the item identifier encoded in the machine-readable label based on the modified image. The automated checkout system may identify the item identifier by applying a label decoding model to the modified image of the machine-readable label. The label decoding model is a machine-learning model that is trained to identify item identifiers encoded in machine-readable labels based on images of the machine-readable labels. For example, the label decoding model may be trained based on a set of training examples, wherein each training example includes an image of a machine-readable label and a label indicating which item identifier is encoded in the machine-readable label. In some embodiments, the training examples only have clean, un-distorted images of machine-readable labels (i.e., images of machine-readable labels whose features are clear for the label decoding model to analyze). Alternatively, the training examples may include modified images that have been processed as described above.

The automated checkout system may use the identified item identifier to identify an item collected by a user. This item may be an item to which the machine-readable label is affixed. The automated checkout system may add the item corresponding to the item identifier to a user's shopping list. Similarly, the user collecting the items may be a picker that is servicing an order from another user of an online concierge system. In this case, the automated checkout system may use the item identifier to determine that the corresponding item has been collected for the user's order.

Figure 6:
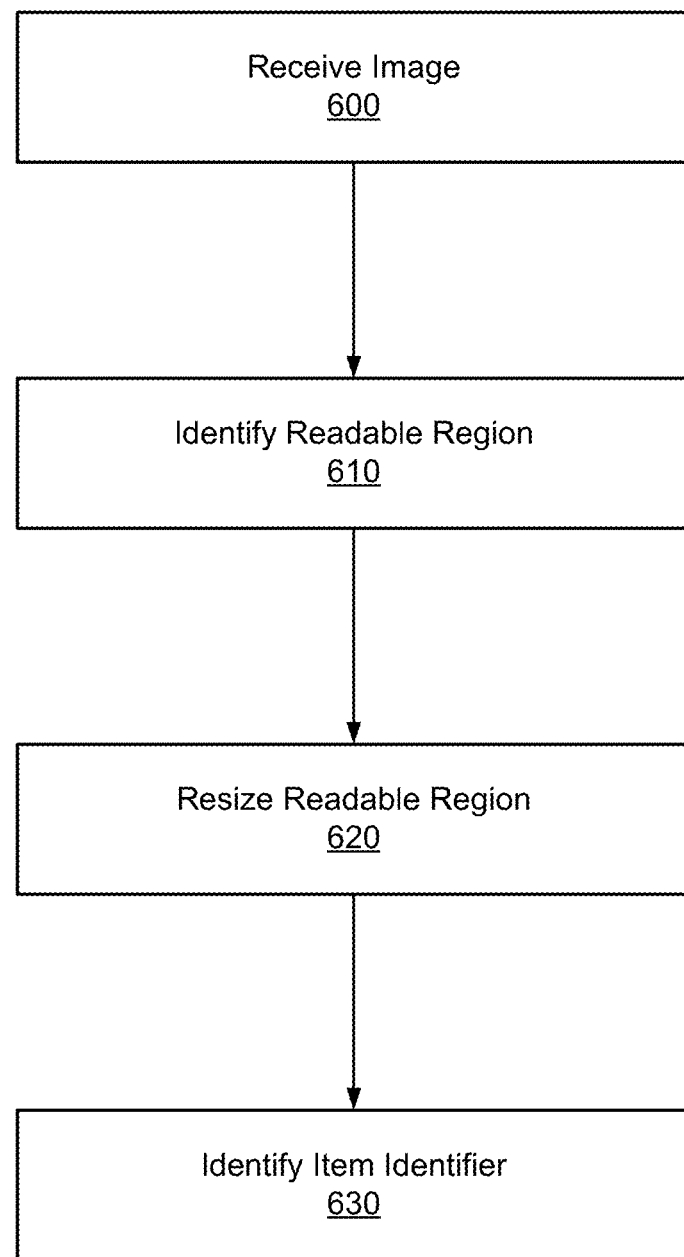
FIG. 6 is a flowchart for a method of using readable regions of an image of a machine-readable label to identify an item identifier, in accordance with some embodiments.

FIG. 6 is a flowchart for a method of using readable regions of an image of a machine-readable label to identify an item identifier, in accordance with some embodiments. Alternative embodiments may include more, fewer, or different steps from those illustrated in FIG. 6, and the steps may be performed by an automated checkout system (e.g., automated checkout system 130). Additionally, each step may be performed automatically by the automated checkout system without human intervention.

The automated checkout system receives 600 an image depicting a machine-readable label. A machine-readable label is a label affixed to a read world object (e.g., an item) that can be optically read by a computing device. For example, the machine-readable label may be a barcode or a quick response (QR) code. The machine-readable label encodes an item identifier for an item. The machine-readable label may be affixed to the item for its corresponding encoded item identifier, and the image may depict the item as well as the machine-readable label.

In some embodiments, the automated checkout system receives the image from a client device of a user. For example, the automated checkout system may receive the image from a client device executing a client application for the automated checkout system that allows the user to automatically add items to a shopping list by capturing images of machine-readable labels of items. Alternatively, the automated checkout system may receive the image from a camera on a shopping cart. For example, a camera on a shopping cart may capture an image of the machine-readable label and transmit the machine-readable label to the automated checkout system to identify the item identifier encoded by the machine-readable label.

Figure 7:
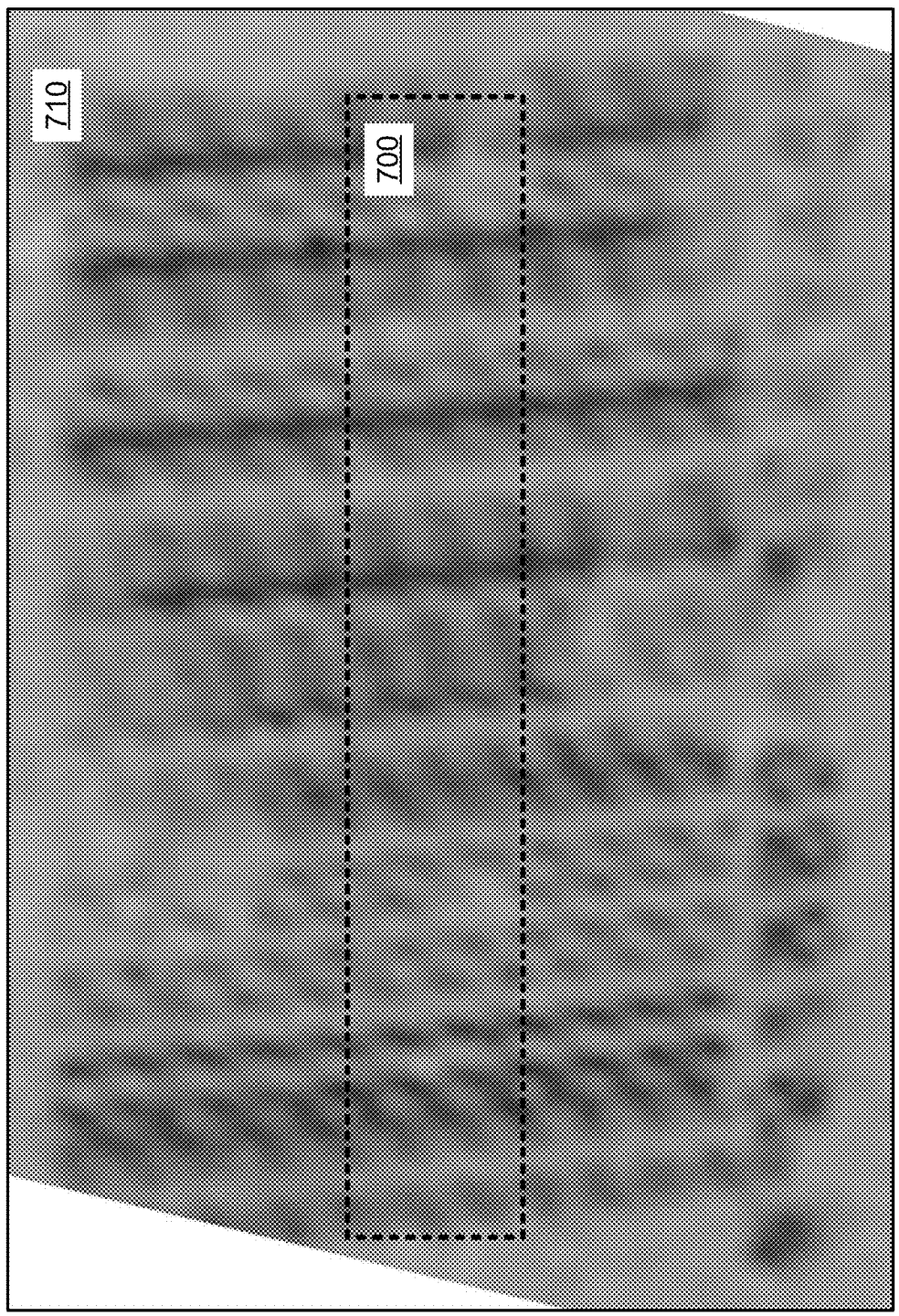
FIG. 7 illustrates an example readable region identified on an image of a machine-readable label, in accordance with some embodiments.

The automated checkout system identifies 610 a readable region of the received image. A readable region of the image is a portion of the image from which a label detection model is likely to be able to predict the item identifier encoded by the machine-readable label. For example, a readable region may be a portion of the image for which the likelihood that a label detection model will correctly identify the item identifier exceeds some threshold value. FIG. 7 illustrates an example readable region 700 identified on an image of a machine-readable label 710, in accordance with some embodiments.

The automated checkout system identifies readable regions in images by applying a readability detection model to the images. A readability detection model is a machine-learning model that is trained to identify readable regions within images of machine-readable labels. For example, the readability detection model may be trained based on a set of training examples, where each training example includes an image of a machine-readable label and a label indicating a readable region of the image. The training examples may be generated manually or automatically by the automated checkout system.

In some embodiments, the automated checkout system generates training examples by randomly generating regions on images of machine-readable labels and checking whether a label detection model can correctly identify the item identifiers for the machine-readable labels based on the randomly generated regions. In these embodiments, to generate a training example, the automated checkout system randomly generates a set of regions on the image and applies a label detection model to the regions. In some embodiments, the automated checkout system resizes the randomly-generated regions to dimensions to which the label detection model can be applied.

The automated checkout system determines whether the label detection model can correctly predict the item identifier encoded by the machine-readable label based on the randomly-generated regions. If the label detection model correctly predicts the item identifier based on the randomly-generated region, the automated checkout system generates a training example with the image and a label indicating the randomly-generated region. If the label detection model does not correctly predict the item identifier, the automated checkout system may generate a negative training example (i.e., a training example that indicates that the randomly-generated region is not readable) or may not generate a training example at all. The label detection model may not correctly predict the item identifier by affirmatively predicting an item identifier that is incorrect (i.e., an item identifier that does not correspond with the item identifier encoded in the machine-readable label depicted by the image. Similarly, the label detection model has not correctly predicted the item identifier if the label detection model is not sufficiently certain as to which item identifier is encoded in the machine-readable label (e.g., because the model produces a confidence score for its prediction that is below a threshold value).

Figure 8:
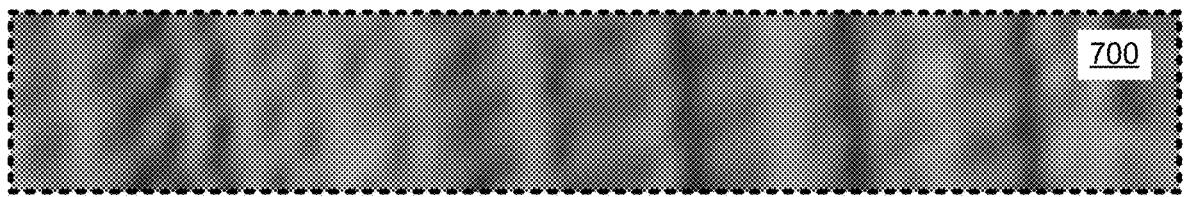
FIG. 8 illustrates an example resized image generated based on the identified readable region illustrated in FIG. 7, in accordance with some embodiments.
Figure 8:
Figure 8:
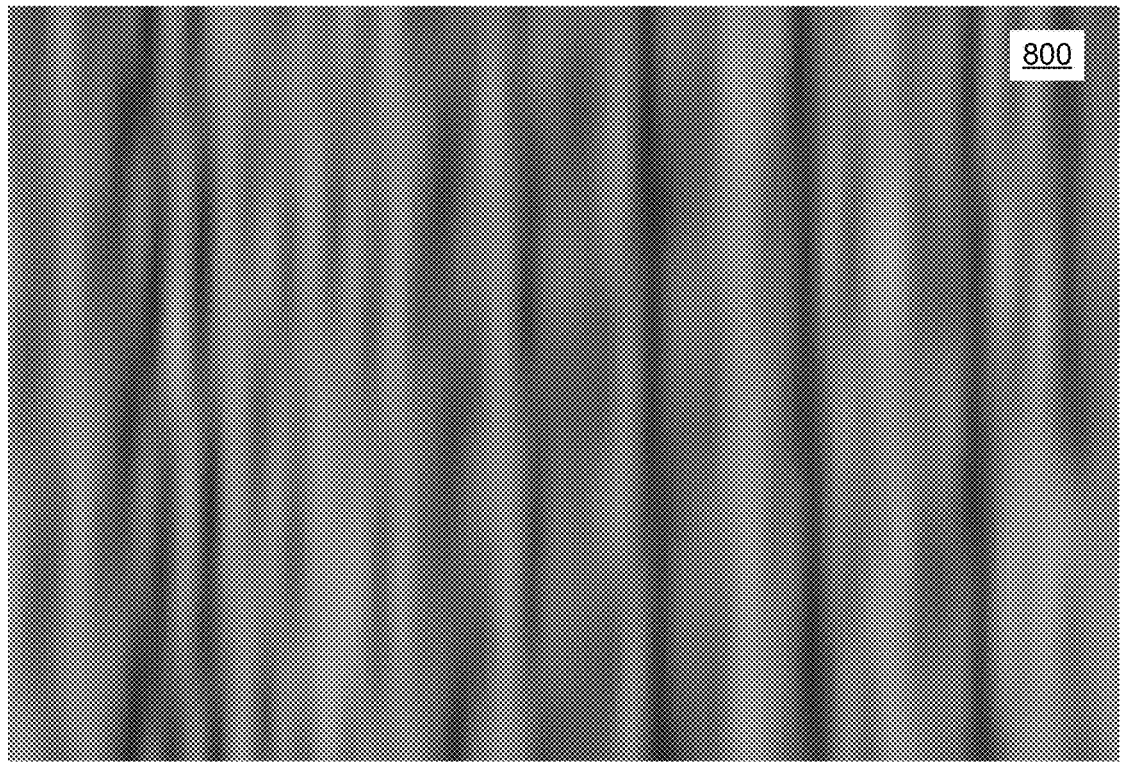

The automated checkout system resizes 620 the readable region to dimensions to which the label detection model can be applied. For example, the automated checkout system may upsample the readable region to create an image with sufficient dimensions for the label detection model. FIG. 8 illustrates an example resized image 800 generated based on the identified readable region 700 illustrated in FIG. 7, in accordance with some embodiments.

The automated checkout system identifies 630 the item identifier by applying the label detection model to the resized readable region. The label decoding model is a machine-learning model that is trained to identify item identifiers encoded in machine-readable labels based on images of the machine-readable labels. For example, the label decoding model may be trained based on a set of training examples, wherein each training example includes an image of a machine-readable label and a label indicating which item identifier is encoded in the machine-readable label. In some embodiments, the training examples only have clean, un-distorted images of machine-readable labels (i.e., images of machine-readable labels whose features are clear for the label decoding model to analyze). Alternatively, the training examples may include resized readable regions from images of machine-readable labels.

The automated checkout system may use the identified item identifier to identify an item collected by a user. This item may be an item to which the machine-readable label is affixed. The automated checkout system may add the item corresponding to the item identifier to a user's shopping list. Similarly, the user collecting the items may be a picker that is servicing an order from another user of an online concierge system. In this case, the automated checkout system may use the item identifier to determine that the corresponding item has been collected for the user's order.

OTHER CONSIDERATIONS

The foregoing description of the embodiments has been presented for the purpose of illustration; it is not intended to be exhaustive or to limit the scope of the disclosure. Many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one or more embodiments, a software module is implemented with a computer program product comprising one or more computer-readable media containing computer program code or instructions, which can be executed by a computer processor for performing any or all of the steps, operations, or processes described. In one or more embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to an apparatus for performing the operations herein. This apparatus may be specially constructed for the required purposes, or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The weights may be stored on one or more computer-readable media, and are used by a system when applying the machine-learning model to new data.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C having at least one element in the combination that is true (or present). As a not-limiting example, the condition "A, B, or C" is satisfied by A and B are true (or present) and C is false (or not present). Similarly, as another not-limiting example, the condition "A, B, or C" is satisfied by A is true (or present) and B and C are false (or not present).

What is claimed is:

1. A method comprising, at a computer system comprising a processor and a computer-readable medium:
   receiving an image depicting a machine-readable label;
   generating a set of initial subregions of the image;
   generating a transformation matrix for each initial subregion of the set of initial subregions, wherein each transformation matrix comprises a set of values for transforming a corresponding initial subregion into a standardized subregion;
   generating a set of standardized subregions of the image by applying each transformation matrix to a corresponding initial subregion of the set of initial subregions;
   concatenating the set of standardized subregions into a modified image;
   identifying an item identifier encoded in the machine-readable label by applying a label decoding model to the modified image, wherein the label decoding model is trained to predict item identifiers based on images of machine-readable labels; and
   presenting content related to an item associated with the item identifier on a display of a computer system.

2. The method of claim 1, wherein the image is received from a camera coupled to a shopping cart, and wherein presenting the content related to an item comprises:
   transmitting the item identifier to the shopping cart for display to a user operating the shopping cart via a user interface coupled to the shopping cart.

3. The method of claim 1, wherein the image is received from a client device operated by a user, and wherein presenting the content related to an item comprises:
   transmitting the item identifier to the client device for display to a user operating the client device.

4. The method of claim 1, further comprising:
   generating a set of boundary points on the image by:
      identifying a plurality of points in the image depicting plurality of corners of the machine-readable label; and
      generating a plurality of boundary points based on the plurality of points depicting the plurality of corners; and
   generating the set of initial subregions based on the boundary points, wherein each initial subregion of the set of initial subregions comprises a plurality of corners at a subset of the set of boundary points.

5. The method of claim 4, wherein generating a set of boundary points on the image comprises:
   identifying a point on the image between a pair of the plurality of points depicting the plurality of corners; and
   generating a boundary point based on the identified point.

6. The method of claim 1, wherein each of the set of initial subregions of the image is a quadrilateral.

7. The method of claim 6, wherein each of the set of standardized subregions is a rectangle.

8. The method of claim 1, wherein each of the set of initial subregions of the image is a triangle.

9. The method of claim 8, wherein each of the set of standardized subregions is one of an equilateral triangle, an isosceles triangle, or a right triangle.

10. The method of claim 1, wherein each of the initial subregions of the image is an irregular shape.

11. A non-transitory computer-readable medium storing instructions that, when executed by a processor, cause the processor to:
    receive an image depicting a machine-readable label;
    generate a set of initial subregions of the image;
    generate a transformation matrix for each initial subregion of the set of initial subregions, wherein each transformation matrix comprises a set of values for transforming a corresponding initial subregion into a standardized subregion;
    generate a set of standardized subregions of the image by applying each transformation matrix to a corresponding initial subregion of the set of initial subregions;
    concatenate the set of standardized subregions into a modified image;
    identify an item identifier encoded in the machine-readable label by applying a label decoding model to the modified image, wherein the label decoding model is trained to predict item identifiers based on images of machine-readable labels; and
    present content related to an item associated with the item identifier on a display of a computer system.

12. The computer-readable medium of claim 11, wherein the image is received from a camera coupled to a shopping cart, and wherein presenting the content related to an item comprises:
    transmitting the item identifier to the shopping cart for display to a user operating the shopping cart via a user interface coupled to the shopping cart.

13. The computer-readable medium of claim 11, wherein the image is received from a client device operated by a user, and wherein presenting the content related to an item comprises:
    transmitting the item identifier to the client device for display to a user operating the client device.

14. The computer-readable medium of claim 11, further storing instructions, when executed, cause a processor to:
    generate a set of boundary points on the image by:
       identifying a plurality of points in the image depicting plurality of corners of the machine-readable label; and
       generating a plurality of boundary points based on the plurality of points depicting the plurality of corners; and
    generate the set of initial subregions based on the boundary points, wherein each initial subregion of the set of initial subregions comprises a plurality of corners at a subset of the set of boundary points.

15. The computer-readable medium of claim 14, wherein the instructions for generating a set of boundary points on the image comprise instructions that, when executed, cause a processor to:
    identify a point on the image between a pair of the plurality of points depicting the plurality of corners; and
    generate a boundary point based on the identified point.

16. The computer-readable medium of claim 11, wherein each of the set of initial subregions of the image is a quadrilateral.

17. The computer-readable medium of claim 16, wherein each of the set of standardized subregions is a rectangle.

18. The computer-readable medium of claim 11, wherein each of the set of initial subregions of the image is a triangle.

19. The computer-readable medium of claim 18, wherein each of the set of standardized subregions is one of an equilateral triangle, an isosceles triangle, or a right triangle.

20. A system comprising:

a processor; and a non-transitory computer-readable medium storing instructions that, when executed by the processor, cause the processor to:
  receive an image depicting a machine-readable label;
  generate a set of initial subregions of the image;
  generate a transformation matrix for each initial subregion of the set of initial subregions, wherein each transformation matrix comprises a set of values for transforming a corresponding initial subregion into a standardized subregion;
  generate a set of standardized subregions of the image by applying each transformation matrix to a corresponding initial subregion of the set of initial subregions;
  concatenate the set of standardized subregions into a modified image;
  identify an item identifier encoded in the machine-readable label by applying a label decoding model to the modified image, wherein the label decoding model is trained to predict item identifiers based on images of machine-readable labels; and
  present content related to an item associated with the item identifier on a display of a computer system.

* * * * *